A. J. BOWERS.
METHOD OF MAKING MULTIFOCAL LENSES.
APPLICATION FILED JUNE 20, 1907.
1,041,235.   Patented Oct. 15, 1912.
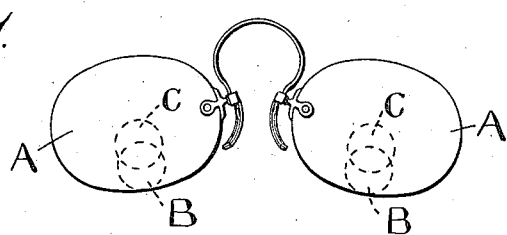
Fig. 1.
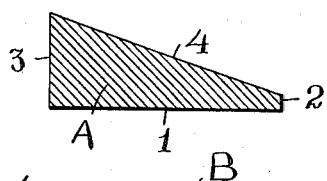
Fig. 2.
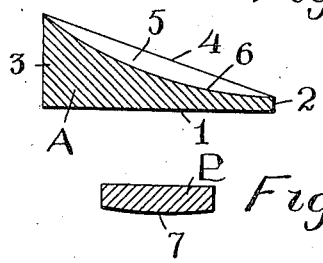
Fig. 3.
Fig. 4.
Fig. 5.
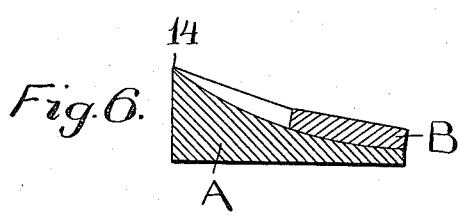
Fig. 6.
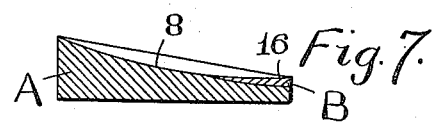
Fig. 7.
Fig. 8.
Fig. 9.
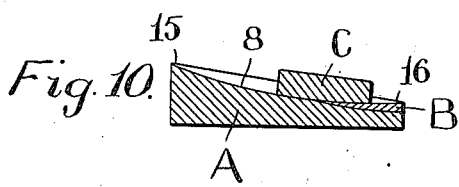
Fig. 10.
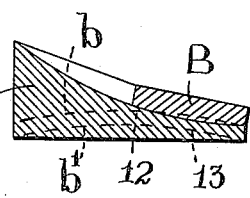
Fig. 11.
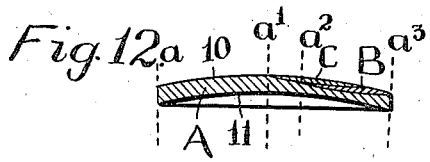
Fig. 12.
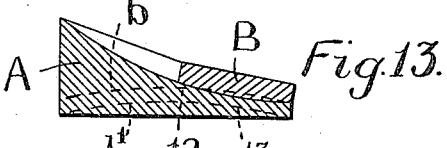
Fig. 13.
Witnesses
R. B. Tolman.
Penelope Comberbach.
Inventor
Albert J. Bowers.
By Henry Wood Fowler
Attorney

UNITED STATES PATENT OFFICE.

ALBERT J. BOWERS, OF WORCESTER, MASSACHUSETTS.

METHOD OF MAKING MULTIFOCAL LENSES.

1,041,235. Specification of Letters Patent. Patented Oct. 15, 1912.

Application filed June 20, 1907. Serial No. 379,990.

*To all whom it may concern:*

Be it known that I, ALBERT J. BOWERS, a citizen of the United States, residing at Worcester, in the county of Worcester and Commonwealth of Massachusetts, have invented a new and useful Improvement in Methods of Making Multifocal Lenses, of which the following is a specification, accompanied by drawings forming a part of the same, in which—

Figure 1 represents a front view of a multifocal eyeglass embodying my invention, said eyeglass containing lens having three focal powers. Fig. 2 represents in sectional view a piece of glass known as crown glass, and illustrating the first step in my improved method of constructing a multifocal lens. Fig. 3 represents the same piece with one of its surfaces ground in concave form to receive a wafer of flint glass, whereby the second focal power of the lens is produced, and illustrating the second step in my improved method. Fig. 4 represents a piece of flint glass from which one of the wafers is formed. Fig. 5 represents the same piece of glass ground on one side to produce a convex surface fitting the concave surface of the lens, and illustrating the third step in my improved method. Fig. 6 represents the piece shown in Fig. 5 as applied to the piece represented in Fig. 3 and united thereto by fusion of their contacting surfaces, and illustrating the fourth step in my improved method of construction. Fig. 7 illustrates the fifth step which consists in grinding a concave surface to receive a second wafer of flint glass, the curvature of the ground surface being adapted to secure requisite refraction for the third focal power of the lens. Fig. 8 represents a piece from which the second wafer is formed. Fig. 9 represents the piece shown in Fig. 8 with one side ground to form a convex surface to fit the concave surface shown in Fig. 7, and illustrating the sixth step in my improved method. Fig. 10 represents the piece shown in Fig. 9 as applied to the concave surface of the lens and united therewith by fusion, and illustrating the seventh step in my improved method. Fig. 11 illustrates the eighth step in my improved method which consists in forming a convex surface upon one side of the lens of the required curvature to form the lens. Fig. 12 illustrates the ninth step which consists in grinding the opposite side of the lens to form a concave surface to complete the lens, having the required refraction in the crown glass section to give the third focal power between the lines $a$, $a^1$, the second focal power between the lines $a^1$, $a^2$, and the first focal power between the lines $a^2$, $a^3$, and Fig. 13 represents the same view as Fig. 6, showing a single piece of flint glass applied to the crown glass which has been ground to complete a lens conforming in cross section to the space inclosed between the broken lines $b$, $b^1$, thereby completing a lens having two focal powers only and embodying a single wafer of flint glass.

Similar reference letters and figures refer to similar parts in the different views.

My invention relates to that class of lenses which are composed of superimposed layers of glass having different refractive powers, the surfaces of said layers being curved, whereby the refraction of the individual layers is determined, and it has for its objects to facilitate the grinding of the composite lens, to secure greater accuracy in the ground surfaces, to better enable the composite parts of the lens to be united by fusing their contacting surfaces without injury, and to avoid any errors in the construction of the lens due to slight displacement of the wafers, and I accomplish these objects by the process of manufacture as hereinafter described and pointed out in the annexed claims.

My invention is carried into effect as follows:—I first prepare a piece of glass, preferably of the refractive power known as crown glass, of any suitable size or shape in plan view to form the desired eye of the eyeglass or spectacle, but having its cross section in the plane of the minor axis of the finished lens in the form of a truncated triangle, as shown at A, Fig. 2, with one side 1 at right angles with the opposite ends 2, 3, and with the other side 4 lying in a plane at an oblique angle to the side 1. The oblique side 4 is then ground to form a concave circular recess 5, the curvature of the concave surface 6, forming the bottom of the recess, being determined by the required focal power of a wafer, preferably made of flint glass or glass having a different refractive power from that of crown glass of which the piece A is composed. The concaving of the oblique surface 4 extends entirely across piece A with the axis of its curvature lying in a plane at right angles to the oblique side 4. A piece of flint glass B, of sufficient size to form one of the wafers preferably circular in plan view, is then ground upon one side to form a convex surface 7 having a curvature equal to that of the curved surface 6, Fig. 3. The piece B having been thus ground on one side is applied to the piece A, and near one edge thereof as shown in Fig. 6. The contacting curved surfaces are then united, preferably by fusion, and the combined pieces A and B after having been attached, as shown in Fig. 6, are again ground to form a concave surface 8 having the proper curvature to secure, when the second wafer of flint glass is applied, the third desired focal power. A second piece of flint glass C, as shown in Fig. 8, is then ground on one side to produce a convex surface 9, as shown in Fig. 9, corresponding to the curvature of the concave surface 8. The piece C is then applied to the piece A, somewhat nearer its center then the piece B and, if necessary, overlapping the piece B. The contacting surfaces are then united, preferably by fusion, and the composite surface is again ground in convex form having a curvature as shown at 10, Fig. 11, and the eyeglass is then completed by grinding a corresponding concave surface on the opposite side, as shown at 11, Fig. 12. When thus completed the eyeglass will possess three focal powers, one between the points $a$, $a^1$, determined by the refractive power of the crown glass and the curvature of the lens; a second focal power between the points $a^1$, $a^2$, due to the combined but different refractive powers of the crown glass and flint glass and the shape in cross section of the flint glass as determined by the curved surface 10, which forms the outer surface of the lens, and the curved surface 8, which forms the seat of the flint glass wafer C, and a third focal power between the points $a^2$, $a^3$, due to the combined refractive power of the flint glass wafer B and the shape in cross section of the flint glass as determined by the curved surface 10 and the curved surface 6, which forms the seat of the flint glass wafer B.

The eyeglass shown in Fig. 12 possesses, therefore, three focal powers which may be adapted for distant, medium, and near to vision; but in case two focal powers only are required the combined pieces A and B after having been attached, as shown in Fig. 6 and again in Fig. 13, are ground to form a concavo-convex lens by grinding the combined pieces A and B on the broken curved lines 12 and 13, Fig. 13.

I am aware that it is not new to form an eyeglass having more than one focal power by the combination of two pieces of glass having different refractive powers, such as crown glass and flint glass, and I am aware also that such pieces have had their contacting surfaces united by fusion. In the construction of an eyeglass of this kind, however, it has been the practice to form a concave recess in the surface of a piece of crown glass of uniform thickness, said recess being of substantially the same size as the flint glass wafer, and after the flint glass wafer has been ground to fit the recess thus formed and the pieces attached by fusion, the composite piece thus formed is ground to produce an eyeglass having the desired focal powers.

By my improved method I form the concave recess for the first wafer upon one side of a piece of crown glass A which is considerably thicker at one edge than the other, which enables me to grind the concave recess covering substantially the entire area of the eyeglass, the arc of this curvature extending across the glass from its thin to its thick edge, thereby securing the following advantages among others in the process of manufacture; greater accuracy is secured in the curvature of the surface which is to form the seat than when a small recess only is formed; the wafer is supported throughout its entire extent upon its curved seat; it becomes unnecessary to accurately determine the position of the curved seat, as in the case of a small recess, for the entire surface of the eyeglass possesses the required curvature and the wafer can be attached in any position desired; in grinding the eyeglass the grinding operation takes place simultaneously upon opposite sides of the center or axis of the lens, for example, the first ground surface to form the concave surface 6 extends entirely across the piece of crown glass and in grinding the second curved seat formed by the surface 8 the grinding takes place on opposite sides of the center of the lens, namely, upon the flint glass wafer B and upon the edge 14 of the crown glass, likewise in grinding the convex surface 10 the grinding takes place on opposite sides of the center, namely, upon the flint wafer C and upon the edge 15 of the crown glass.

By making the curved seats for the flint glass wafers to extend substantially across the entire width of the crown glass I am able to apply pieces B and C of considerably larger size than the size of the finished wafers and support them throughout their entire area, which facilitates the process of fusing the contacting surfaces together and which also enables me to place the first wafer B at the extreme edge of the crown glass, and to leave a comparatively thick edge, as shown at 16, Figs. 7 and 10, after the curved surface 8 is formed.

In practice, I prefer to perform the several steps in the operation of making a multifocal lens in the order named above; but the same result may be secured by forming the concave surface 11 in the piece A, by pressing or otherwise, before the curved seat 6 is formed for the first wafer. When this is done the entire piece A as shown in Fig. 2, is pressed into the form or molded with its under side concaved as shown in Figs. 12 and 13, only requiring to be polished and avoiding the necessity of grinding away so much material. By my improved method of constructing lenses having three focal powers, I am enabled to place the wafer, giving the intermediate focal distance outside and overlapping the wafer giving the shortest focal distance, and as the focal power of both wafers is determined by the curvature of the seat, I am able to grind the edges of both wafers extremely thin, and I am also able to unite the several pieces of flint glass by fusion inasmuch as the pieces are of substantially uniform thickness in cross section, and they are both fused before their edges have been reduced in thickness, causing the heat to be equally diffused throughout the entire mass of glass.

I claim,

1. The method of making a multifocal lens from a piece of glass of suitable size to form the completed lens by attaching a wafer to its surface in the following manner; by grinding one side of said piece in a curve determined by the desired curvature of the contacting surface of the wafer, with said curve extending entirely across said side and larger in area than said completed wafer, attaching in any desired position on said curved surface a segment, of area smaller than said curved surface and designed to form said wafer, then grinding said piece with said segment attached to form the completed lens.

2. The method of making a multifocal lens from a piece of glass of suitable size to form the completed lens, having its cross section in the plane of the minor axis of the finished lens with one oblique side, by attaching a wafer to said oblique side in the following manner; by grinding said entire oblique side in a curve determined by the desired curvature of the contacting surface of the wafer, said curvature of larger area than said completed wafer, attaching in any desired position on said curved surface a segment, of area smaller than said curved surface and designed to form said wafer, then grinding the said piece with said segment attached to form the completed lens.

3. The method of making a multifocal lens from a piece of glass of suitable size to form the desired lens by attaching two or more wafers to its surface in the following manner, first, grinding one side of said piece of glass in the desired curve of the contacting face of the first wafer, said curve extending entirely across said side, permanently attaching to a portion of said curved surface a segment designed to form the first wafer, then grinding said entire curved surface and the segment attached thereto in the desired curve of the contacting face of the second wafer, permanently attaching to a portion of the said second curved surface a segment designed to form the second wafer, with part of its surface in contact with said piece of glass and part in contact with said first segment, and grinding the united piece of glass and two segments to form the completed lens.

4. The method of making a multifocal lens from a piece of glass of prismatic form and of suitable size to form the desired lens by permanently attaching successive segments designed to form the wafers to successive curved seats in the oblique side of said piece of glass, each curved seat extending entirely across said oblique side with the desired curve of the attached wafer, and grinding the united piece of glass and segments to form the completed lens.

5. The method of making a multifocal lens from a piece of glass of suitable size to form the desired lens by grinding successively curved seats of the same size but of different radii in said glass, each seat extending entirely across said glass, and permanently attaching to each successive seat a segment designed to form a wafer, each segment in a different position on its seat with relation to the center of the lens, and grinding the united piece of glass and segments to form the completed lens.

ALBERT J. BOWERS.

Witnesses:
Penelope Comberbach,
Rufus B. Fowler.